US011816654B2

(12) United States Patent
Padiyar et al.

(10) Patent No.: US 11,816,654 B2
(45) Date of Patent: Nov. 14, 2023

(54) GEOGRAPHIC LOCATION BASED MOBILE TRANSACTION ADAPTER

(71) Applicant: Bank of America Corporation, Charlotte, NC (US)

(72) Inventors: Sneha Padiyar, East Mumbai (IN); Govinda Rajulu Nelluri, Hyderabad (IN); Sandeep Kumar Chauhan, Hyderabad (IN); Shailendra Singh, Maharashtra (IN); Pavan Kumar Gauji, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/554,066

(22) Filed: Dec. 17, 2021

(65) Prior Publication Data

US 2023/0196330 A1 Jun. 22, 2023

(51) Int. Cl.
*G06Q 20/32* (2012.01)
*G06Q 20/40* (2012.01)

(52) U.S. Cl.
CPC ..... *G06Q 20/3224* (2013.01); *G06Q 20/4015* (2020.05)

(58) Field of Classification Search
CPC .......... G06Q 20/3224; G06Q 20/4015; G06Q 40/02–04
See application file for complete search history.

(56) References Cited

U.S. PATENT DOCUMENTS

| 6,507,589 | B1 * | 1/2003 | Ramasubramani ..... H04L 12/66 370/465 |
| 7,966,282 | B2 | 6/2011 | Pinckney et al. |
| 11,100,499 | B1 | 8/2021 | McDonnell et al. |
| 2002/0120846 | A1 * | 8/2002 | Stewart ................ G06Q 20/401 713/168 |
| 2003/0093372 | A1 * | 5/2003 | Atogi ..................... G06Q 30/06 705/40 |

(Continued)

OTHER PUBLICATIONS

Nov. 10, 2022—U.S. Non-Final Office Action—U.S. Appl. No. 17/554,082.

(Continued)

*Primary Examiner* — Eric T Wong
(74) *Attorney, Agent, or Firm* — Banner & Witcoff, Ltd.

(57) ABSTRACT

Arrangements for transaction adapter control are provided. In some aspects, a user device may connect to a network in a current geographic location. The user computing device may detect that a change in geographic location has occurred based on the current geographic location. Responsive to detecting that the change in geographic location has occurred, a mobile transaction adapter associated with or unique to the current geographic location may be downloaded to the user computing device. The mobile transaction adapter may be a plug-in component to a mobile payment application on the user computing device. A request to process a transaction may be received via the mobile payment application on the user device. Upon receiving the request to process the transaction, the mobile transaction adapter may be activated and the request may be routed to the mobile transaction adapter. The requested transaction may then be processed via the mobile transaction adapter.

21 Claims, 14 Drawing Sheets

(56) References Cited

U.S. PATENT DOCUMENTS

| | | | |
|---|---|---|---|
| 2004/0128201 A1* | 7/2004 | Ofir | G07F 19/211 |
| | | | 705/17 |
| 2005/0114367 A1 | 5/2005 | Serebrennikov | |
| 2006/0021026 A1* | 1/2006 | de Bonet | G06F 9/44526 |
| | | | 726/17 |
| 2007/0185991 A1* | 8/2007 | Ofir | G06Q 20/04 |
| | | | 709/224 |
| 2007/0280206 A1* | 12/2007 | Messer | H04L 67/51 |
| | | | 370/352 |
| 2014/0089185 A1* | 3/2014 | Desai | G06Q 10/067 |
| | | | 705/41 |
| 2014/0250006 A1* | 9/2014 | Makhotin | G06Q 20/326 |
| | | | 705/41 |
| 2015/0178708 A1* | 6/2015 | Reutov | G06Q 20/10 |
| | | | 705/44 |
| 2015/0294299 A1* | 10/2015 | Maddocks | G06Q 20/3278 |
| | | | 705/17 |
| 2016/0117682 A1 | 4/2016 | Srinath et al. | |
| 2016/0189135 A1* | 6/2016 | Hird | G06Q 20/3274 |
| | | | 705/41 |
| 2017/0116635 A1* | 4/2017 | Gantert | G06Q 30/0226 |
| 2018/0075137 A1 | 3/2018 | Lifar et al. | |
| 2019/0171977 A1 | 6/2019 | Kurian et al. | |
| 2020/0401918 A1 | 12/2020 | Pinckney et al. | |
| 2021/0027647 A1 | 1/2021 | Baphna et al. | |

OTHER PUBLICATIONS

Apr. 28, 2023—U.S. Final Office Action—U.S. Appl. No. 17/554,082.

* cited by examiner

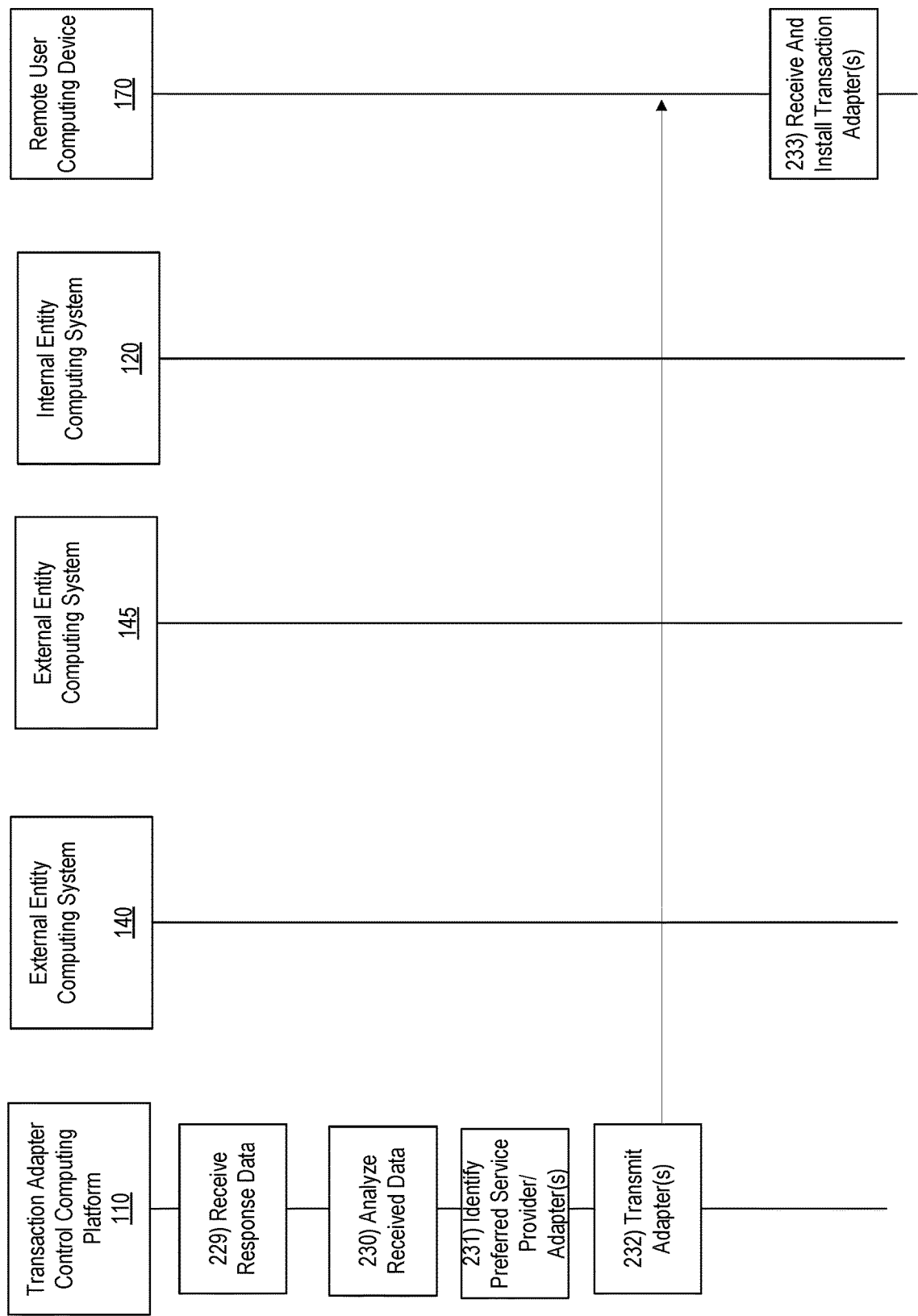

GEOGRAPHIC LOCATION BASED MOBILE TRANSACTION ADAPTER

BACKGROUND

Aspects of the disclosure relate to electrical computers, systems, and devices intelligently routing a transaction request and for processing or executing payments via a geographic location-based mobile transaction adapter.

Various geographic locations have different payment processing systems, requirements for payment processing systems, and the like. Not all payment processing systems, such as mobile payment applications, may operate in all geographic locations or regions. Further, in some areas, requirements may exist for a user to maintain an account at a local financial institution in order to process payments via one or more systems. In addition, in some examples, multiple local or alternative payment processing options may be available. Accordingly, aspects described herein are directed to geographic location specific mobile transaction adapters that rely on intelligent routing to determine an optimized payment processing service for processing a requested transaction.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with processing mobile payments in geographic locations that do not support one or more mobile payment applications and intelligently identifying and routing payment processing to an optimal or preferred service provider.

In some aspects, a user device may connect to a network in a current geographic location. The user computing device may detect that a change in geographic location has occurred based on the current geographic location. Responsive to detecting that the change in geographic location has occurred, a mobile transaction adapter associated with or unique to the current geographic location may be downloaded to the user computing device. The mobile transaction adapter may be a plug-in component to a mobile payment application on the user computing device.

In some examples, a request to process a transaction may be received via the mobile payment application on the user computing device. Upon receiving the request to process the transaction, the mobile transaction adapter may be activated and the request may be routed to the mobile transaction adapter. The requested transaction may then be processed via the mobile transaction adapter.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for implementing transaction adapter control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, many different geographic locations, countries or regions may have different rules or regulations regarding mobile payment or mobile banking applications. Accordingly, as a user travels to different areas, mobile payment or mobile banking applications that function in his or her home region or country might not function in the location to which the user is travelling.

Accordingly, arrangements described herein provide for a bank of mobile transaction adapters. The mobile transaction adapters may be unique to a particular country, region or the like and, in some examples, may be unique to a particular financial institution or payment service provider in a location and may attach to append to a home country banking system of the user.

Accordingly, for a particular country, area or geographic region, a plurality of transaction payment adapters may be available for download and use. Although in some examples, the term "payment adapter" or "mobile payment adapter" may be used, the adapters described herein may be used for any type of transaction without departing from the invention and are not limited to processing of payments.

In some examples, as a user connects to a network in a geographic location (e.g., cellular network wi-fi network, or the like), a notification may be displayed to the user (e.g., via the user computing device) indicating that one or more mobile transaction adapters are available and providing options to select an adapter or for a system to select an adapter. The user may select a desired adapter that may then be downloaded and activated upon receiving a request to process a transaction via the mobile payment or mobile banking application and may route the request to the adapter for processing.

In arrangements in which a system selected adapter is selected, a computing platform may analyze data including external entity data using machine learning to identify an optimal or preferred service provider and/or associated adapter. The identified adapter may then be transmitted to the user device for installation.

These and various other arrangements will be discussed more fully below.

Figure 1A:
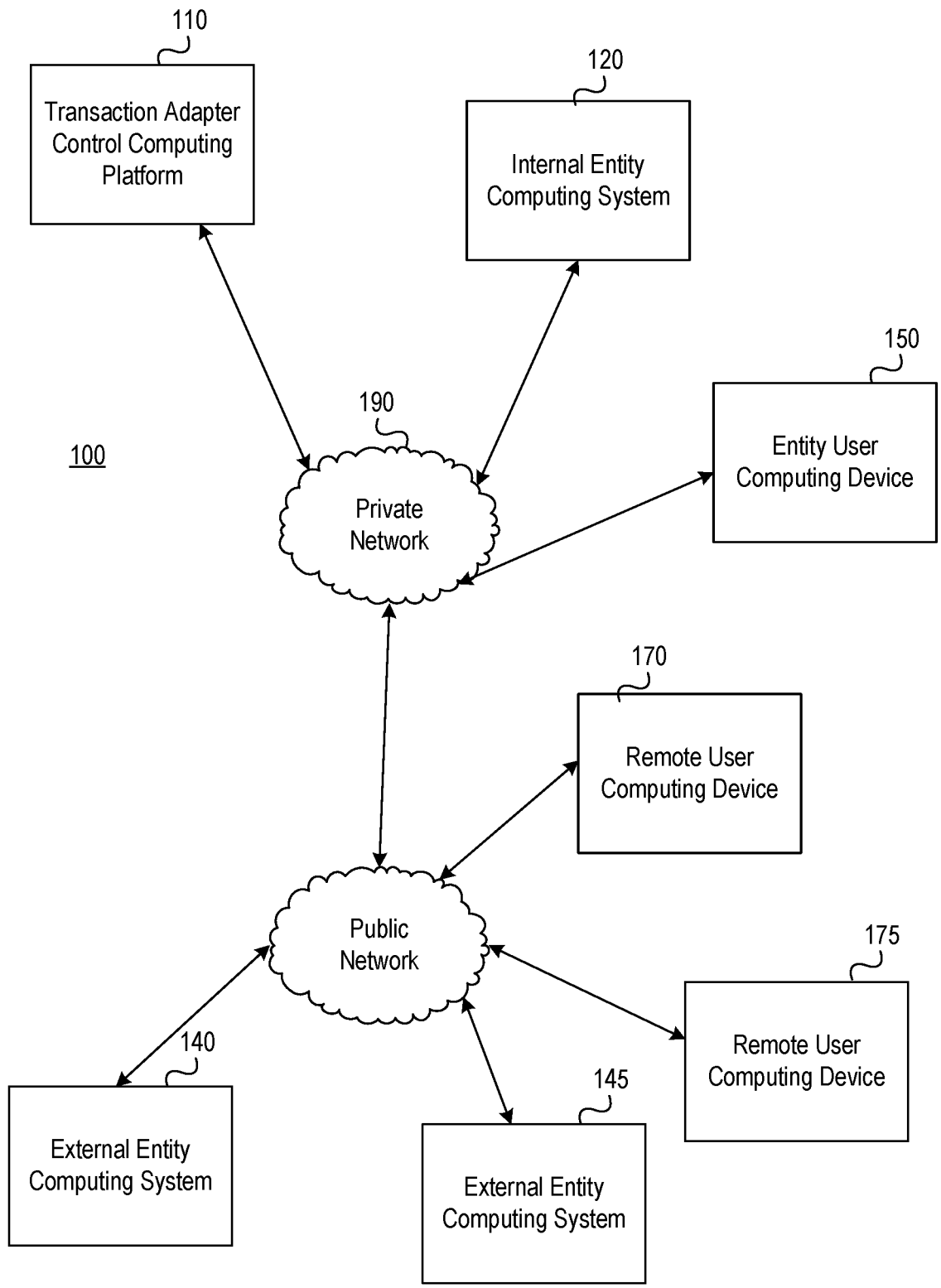
FIGS. 1A and 1B depict an illustrative computing environment for implementing transaction adapter control functions in accordance with one or more aspects described herein.
Figure 1B:
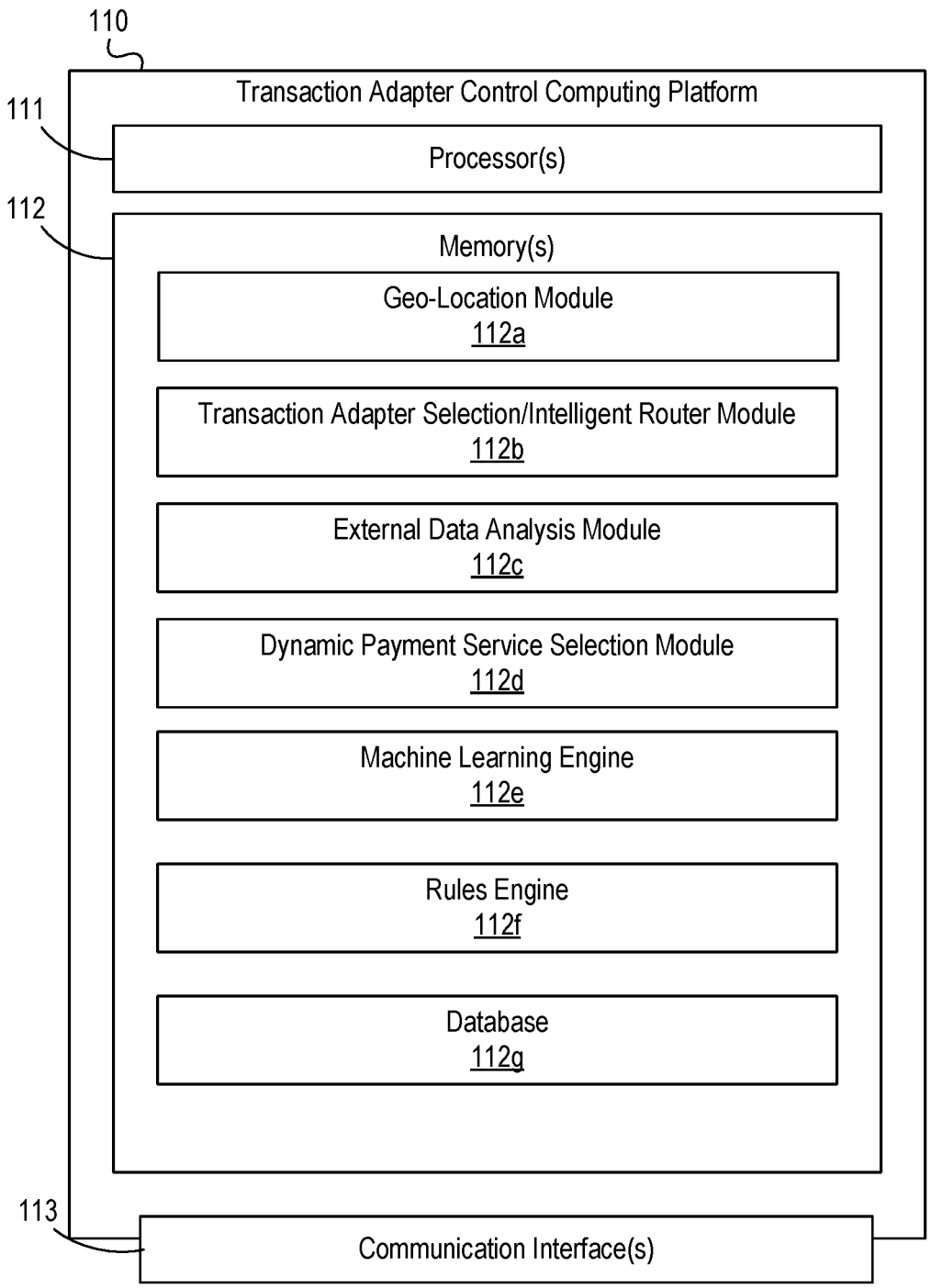

FIGS. 1A-1B depict an illustrative computing environment for implementing and using transaction adapter control functions in accordance with one or more aspects described herein. Referring to FIG. 1A, computing environment 100 may include one or more computing devices and/or other computing systems. For example, computing environment 100 may include transaction adapter control computing platform 110, internal entity computing system 125, external entity computing system 140, external entity computing system 145, entity user computing device 150, remote user computing device 170 and remote user computing device 175.

Transaction adapter control computing platform 110 may be configured to provide intelligent, dynamic transaction adapter functions for users in various geographic areas. For instance, transaction adapter control computing platform 110 may store one or more transaction adapters that may be plug-ins, sub-applications or other components for mobile payment applications or mobile banking applications executing on a user computing device, that, in some examples, may be downloaded to a user device, such as remote user computing device 170, remote user computing device 175, or the like. In some examples, transaction adapter control computing platform 110 may store transaction adapters that are unique to a particular geographic area (e.g., country, region, or the like), unique to a financial institution or service provider in a particular location, and/or may store rules associated with payment options available in each geographic area, as well as tax rules and requirements, and the like. For instance, various transaction processing rules and protocols (e.g., particular to the country or geographic region) may be stored by the transaction adapters and executed to process one or more transactions.

Transaction adapter control computing platform 110 may store and/or execute functions associated with intelligently identifying and routing user transaction requests to an appropriate transaction adapter or service provider in the geographic area. For instance, transaction adapter control computing platform 110 may host, train, execute, validate and/or update a machine learning model configured to identify an optimal payment processing service or mobile transaction adapter to process a requested transaction. Additionally or alternatively, transaction adapter control computing platform 110 may establish any necessary accounts or the like, for a user to perform payment processing via the transaction adapter. For instance, a user may register with transaction adapter control computing platform 110 and may provide information for establishing any necessary accounts, storing user purchase data for tax or reimbursement purposes, and the like.

In some examples, transaction adapter control computing platform 110 may store one or more smart contracts for a user. The one or more smart contracts may be validated using user credentials associated with, for instance, a passport of a user being detected at a particular geographic location. The one or more smart contracts may then execute upon one or more criteria being fulfilled. For instance, in countries or areas in which a visitor pays tax on purchases but is entitled to be reimbursed the amount of the tax, a smart contract may execute upon the user arriving in such a country of area. The smart contract may cause data associated with purchases (e.g., amounts, tax paid, reimbursable amount, and the like) to be stored in a distributed ledger environment. The user may then be presented with one or more options to obtain reimbursement (e.g., one or more user interfaces may be displayed to facilitate reimbursement).

Internal entity computing system 120 may be or include one or more computing devices, systems, or the like, that may host and/or execute one or more applications or systems. For instance, internal entity computing system may host or execute one or more systems for storing account information, user information, and the like. In some examples, internal entity computing system may host or execute applications associated with facilitating payment (e.g., debiting or crediting an account, updating a ledger, and the like). Internal entity computing system 120 may also store user information, account information for the user, and the like. For instance, one or more transaction adapters may be linked to a "home" financial institution of the user. Accordingly, information related to transaction processing may be transmitted to internal entity computing system 120 for account reconciliation, and the like.

Entity user computing device 150 may be or include a laptop computing device, desktop computing device, smart phone, or the like operated by a user associated with an enterprise organization. In some examples, the entity user computing device 150 may be used to generate transaction adapters (e.g., to create adapters based on local regulations, and the like), update adapters, and the like.

External entity computing system 140 and/or external entity computing system 145 may be computing devices, systems, or the like, associated with an entity other than or external to the enterprise organization implementing the transaction adapter control computing platform 110. For instance, external entity computing system 140 and/or external entity computing system 145 may be or include computing devices and/or systems associated with one or more local (e.g., located in, associated with, or the like, a newly detected or current geographic location for which a transaction adapter is being used) payment processing systems. Data associated with time to process a payment (e.g., real-time payment processing time data), fees associated with various types of payment processing, regulations or rules, and the like, for a respective entity associated with the payment processing system of external entity computing system 140 and/or external entity computing system 145 may be received. A machine learning model (e.g., trained on historical payment processing data) may analyze the received data to identify an optimal entity or adapter for processing the requested transaction.

Remote user computing device 170 and/or remote user computing device 175 may be any user computing device, such as an internet of things (IoT) device. In some examples, remote user computing device 170 and/or remote user computing device 175 may be a smart phone, smart watch or other wearable device, tablet computing device, or the like. In some examples, remote user computing device 170 and/or remote user computing device 175 may be configured to generate and/or display notifications, including providing haptic feedback to a user.

Computing environment 100 also may include one or more computing platforms. For example, and as noted above, computing environment 100 may include transaction adapter control computing platform 110. As illustrated in greater detail below, transaction adapter control computing platform 110 may include one or more computing devices configured to perform one or more of the functions described herein. For example, transaction adapter control computing platform 110 may include one or more computers (e.g., laptop computers, desktop computers, servers, server blades, or the like).

As mentioned above, computing environment 100 also may include one or more networks, which may interconnect one or more of transaction adapter control computing platform 110, internal entity computing system 120, entity user computing device 150, external entity computing system 140, external entity computing system 145, remote user computing device 170 and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, transaction adapter control computing platform 110, internal entity computing system 120, entity user computing device 150, may be associated with an enterprise organization (e.g., a financial institution), and private network 190 may be associated with and/or operated by the organization, and may include one or more networks (e.g., LANs, WANs, virtual private networks (VPNs), or the like) that interconnect transaction adapter control computing platform 110, internal entity computing system 120, entity user computing device 150, and one or more other computing devices and/or computer systems that are used by, operated by, and/or otherwise associated with the organization. Public network 195 may connect private network 190 and/or one or more computing devices connected thereto (e.g., transaction adapter control computing platform 110, internal entity computing system 120, entity user computing device 150) with one or more networks and/or computing devices that are not associated with the organization. For example, external entity computing system 140, external entity computing system 145, remote user computing device 170, and/or remote user computing device 175, might not be associated with an organization that operates private network 190 (e.g., because external entity computing system 140, external entity computing system 145, remote user computing device 170, and/or remote user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, external entity computing system 145, remote user computing device 170, and/or remote user computing device 175 to private network 190 and/or one or more computing devices connected thereto (e.g., transaction adapter computing platform 110, internal entity computing system 120, entity user computing device 150).

Referring to FIG. 1B, transaction adapter control computing platform 110 may include one or more processors 111, memory 112, and communication interface 113. A data bus may interconnect processor(s) 111, memory 112, and communication interface 113. Communication interface 113 may be a network interface configured to support communication transaction adapter control computing platform 110 and one or more networks (e.g., private network 190, public network, or the like). Memory 112 may include one or more program modules having instructions that when executed by processor(s) 111 cause transaction adapter control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of transaction adapter control computing platform 110 and/or by different computing devices that may form and/or otherwise make up transaction adapter control computing platform 110.

For example, memory 112 may have, store and/or include geo-location module 112a. Geo-location module 112a may store instructions and/or data that may cause or enable the transaction adapter control computing platform 110 to receive location data from one or more user devices (e.g., global positioning system (GPS) data, or the like), such as remote user computing device 170, remote user computing device 175, or the like. In some examples, location data may be received at pre-determined intervals, continuously, or the like. Additionally or alternatively, geo-location module 112a may be configured to receive an indication from, for instance, a user computing device such as remote user computing device 170, remote user computing device 175, or the like, that the user has changed geographic locations (e.g., is in a different location than previously identified). Geo-location module 112a may, in some examples, receive location data based on a network to which a user device is currently connected (e.g., a local cellular or wi-fi network). This location data may be used to identify one or more appropriate transaction adapters to provide to the user. Additionally or alternatively, geo-location module 112a may retrieve and/or identify regulations, rules, and the like, associated with a location identified based on the geo-location data received from the user device.

Transaction adapter control computing platform 110 may further have, store and/or include transaction adapter selection/intelligent router module 112b. Transaction adapter selection/intelligent router module 112b may store instructions and/or data that may cause or enable the transaction adapter control computing platform 110 to select, based on a geo-location of a user, service provider associated with an adapter, and/or regulations of the location, one or more transaction adapters for use by the user. For instance, the one or more transaction adapters may be a plug-in, sub-application, or other component, that may be downloaded or otherwise provided to one or more user devices, such as remote user computing device 170, remote user computing device 175, or the like, and may facilitate payment via mobile applications that would otherwise not be available for use in the identified location. For instance, some mobile payment applications are restricted from use in one or more locations. Accordingly, the transaction adapter selection/intelligent router module 112b may identify one or more mobile transaction adapters that may be provided to the user device to enable payment via the mobile application (e.g., by intercepting one or more requests for payment or transaction processing) or by redirecting a user request to the transaction adapter for processing payment. In some examples, identifying the one or more mobile transaction adapters may be performed based on the location of the user (e.g., a newly identified location). Additionally or alternatively, identifying the one or more mobile transaction adapters may be performed upon connecting to a network, such as a cellular network, wi-fi network, or the like, in a location.

Additionally or alternatively, transaction adapter selection/intelligent router module 112b may store instructions and/or data that may cause or enable the transaction adapter control computing platform 110 to, after providing one or more adapters to a user device, receive a request for a transaction and, based on transaction details such as transaction type, route the requested transaction to a particular service provider or adapter.

Transaction adapter control computing platform 110 may further have, store and/or include external data analysis module 112c. External data analysis module 112c may store instructions and/or data that may cause or enable the transaction adapter control computing platform 110 to receive data from one or more external sources, such as external entity computing system 140 and/or external entity computing system 145. For instance, external data analysis module 112c may receive data related to processing times for processing a payment, fees associated with processing a payment, and the like. In some examples, the data may be received and analyzed in real-time or near real-time.

Transaction adapter control computing platform 110 may further have, store and/or include dynamic payment service selection module 112d. Dynamic payment service selection module 112d may store instructions and/or data that may cause or enable the transaction adapter control computing platform 110 to dynamically select, from a plurality of payment service providers, one or more payment service providers or transaction adapters associated with a payment service provider or financial institution to process a payment. For instance, machine learning engine 112e may train, execute, update and/or validate one or more machine learning models to identify a best or optimal service provider or mobile transaction adapter to process a transaction. For instance, dynamic payment service selection module 112d may provide, as inputs to the one or more machine learning models, data from one or more external sources related to various payment service providers (e.g., local payment service providers in the new geographic location), user data, and the like, to identify an optimal service provider or transaction adapter.

Machine learning engine 112e may train, execute, update and/or validate one or more machine learning models. For instance, historical data may be used to train the one or more machine learning models. For instance, historical data related to fees for payment processing, time for payment processing, amount of payment, and the like, may be used to train the machine learning model. Additionally or alternatively, historical user data related to purchases and other transactions may be used to train the machine learning model. In some examples, patterns or sequences of data may be identified. Once the model has been trained it may be executed to generate an output including an optimal payment service provider or mobile transaction adapter based on inputs provided. Data may be received after executing the one or more machine learning models and may be used to update and/or validate the one or more machine learning datasets.

Various machine learning algorithms may be used (e.g., by the machine learning engine 112e and/or the one or more machine learning models) without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Transaction adapter control computing platform 110 may further have, store and/or include a rules engine 112f. Rules engine 112f may store instructions and/or data that may cause or enable the transaction adapter control computing platform 110 to store and/or execute one or more rules or protocols associated with processing payments in various geographical areas. For instance, in some locations, a user must have a local account to use a payment processing service, such as a mobile payment application. Accordingly, rules engine may execute a rule to establish an account for a user that is detected in a particular location. In another example, rules engine 112f may store rules associated with tax information such that, as a user processing payments using the mobile transaction adapter for the location, tax information may be collected. In locations in which a user may receive some or all of the tax back because he or she is not a resident, that data may be captured by the rules engine and stored. In some examples, processing the refund request may also be performed by the rules engine 112f (e.g., in conjunction with other modules of the transaction adapter control computing platform 110). In some examples, rules engine 112f may store and/or execute one or more rules for deleting or removing a transaction adapter provided to a user device (e.g., after a user leaves a location or after a new location is detected). In some examples, rules engine 112f may be updated as regulations and protocols for various areas change or are updated, such that updates to an associated transaction payment adapter may be executed.

Transaction adapter control computing platform 110 may further have, store and/or include a database. The database may store data associated with payments processed, may store the transaction adapters that may then be provided to a user, and the like. In some examples, the database may be configured to store one or more smart contracts for execution, distributed ledgers for validating a user or tracking transactions, and the like.

FIGS. 2A-2I depict one example illustrative event sequence for providing transaction adapter control functions in accordance with one or more aspects described herein. The events shown in the illustrative event sequence are merely one example sequence and additional events may be added, or events may be omitted, without departing from the invention. Further, one or more processes discussed with respect to FIGS. 2A-2I may be performed in real-time or near real-time.

Figure 2A:
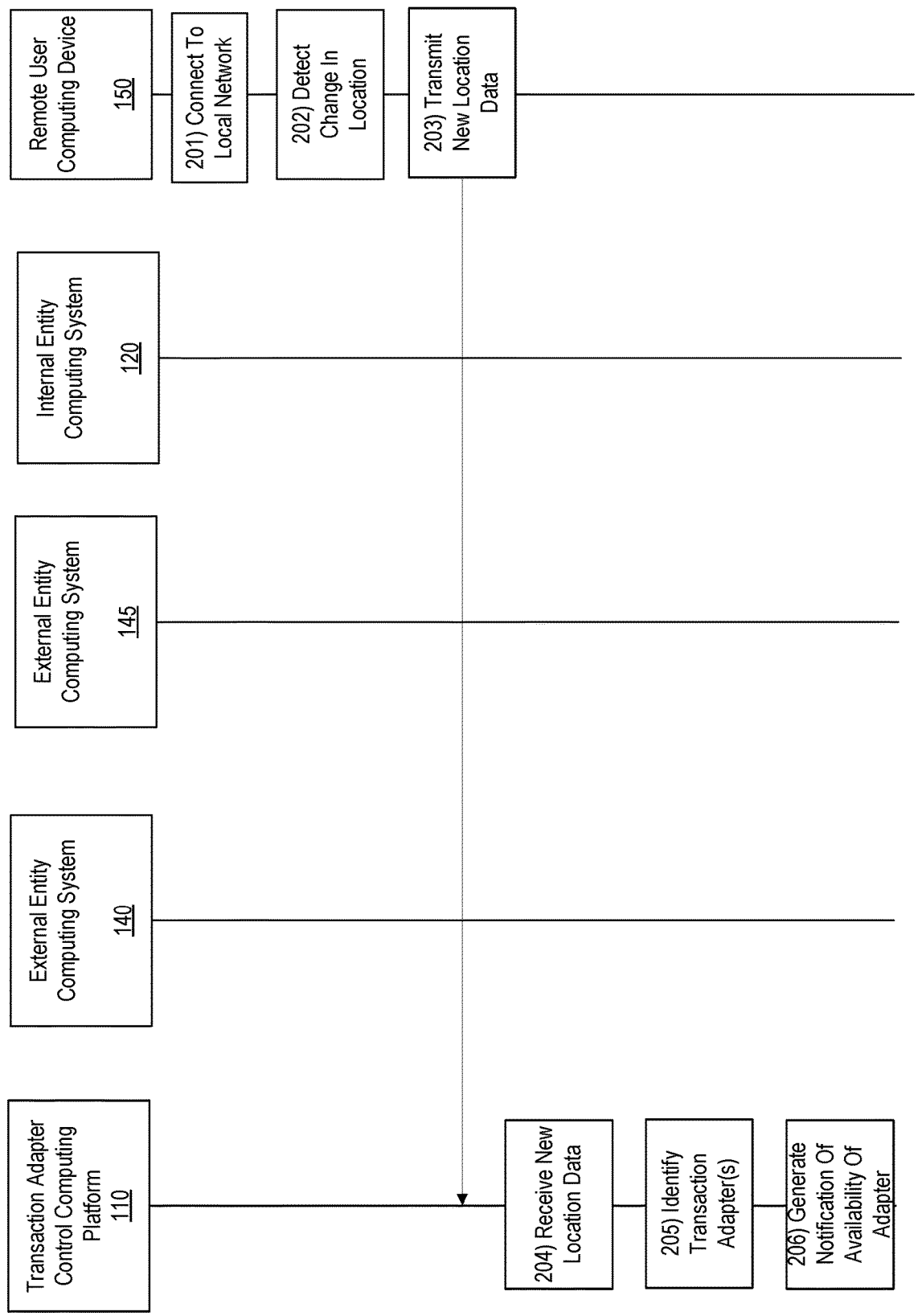

Referring to FIG. 2A, at step 201, remote user computing device 170 may connect to a local network (e.g., a network at a current geographic location). The network may be a local cellular network, wi-fi network, or the like. For instance, remote user computing device 170 may, upon being powered on or otherwise activated to connect to a network, may connect to a local network in the current geographic location (e.g., new geographic location). Accordingly, if a user lands at an airport in a geographic location, the user may remove the remote user computing device 170 from airplane mode or may power on the device. The remote user computing device 170 may then connect to a local network.

At step 202, a change in location may be detected. For instance, remote user computing device 170 may identify a new or different network from a previous network and may identify that a change in location has occurred. Additionally or alternatively, global positioning system (GPS) data may be used to determine that a current geographic location is different from a previous geographic location. In some examples, current GPS data may be compared to previous GPS data in response to the remote user computing device 170 connecting to a network, on a predetermined schedule, or the like. In some examples, detecting a change in location may include determining that a current location is different from or sufficiently different from (e.g., based on longitude and latitude, based on miles between locations, based on established geo-fences, or the like) from a previous location or an immediately previous location (e.g., the location detected immediately before the current location).

At step 203, remote user computing device 170 may transmit the new or current location data, or detected change in location data to the transaction adapter control computing platform 110. At step 204, the new or current location data may be received by the transaction adapter control computing platform 110.

At step 205, one or more transaction adapters and/or transaction adapter options may be identified. For instance, based on the new or current geographic location data, transaction adapter control computing platform 110 may identify one or more mobile transaction adapters that may be provided to the user. In some examples, the adapters may be selected from a bank of adapters. In some arrangements, each mobile transaction adapter may be unique to the country, region or other geographic location. Additionally or alternatively, each mobile transaction adapter may be unique to a financial institution or service provider in the geographic location.

In some examples, identifying one or more mobile transaction adapters or adapter options may include identifying an option for a system selected adapter.

At step 206, a notification including the identified mobile transaction adapters or adapter options may be generated. In some examples, the notification may include one or more mobile transaction adapters available for selection and/or an option for a system selected adapter.

Figure 2B:
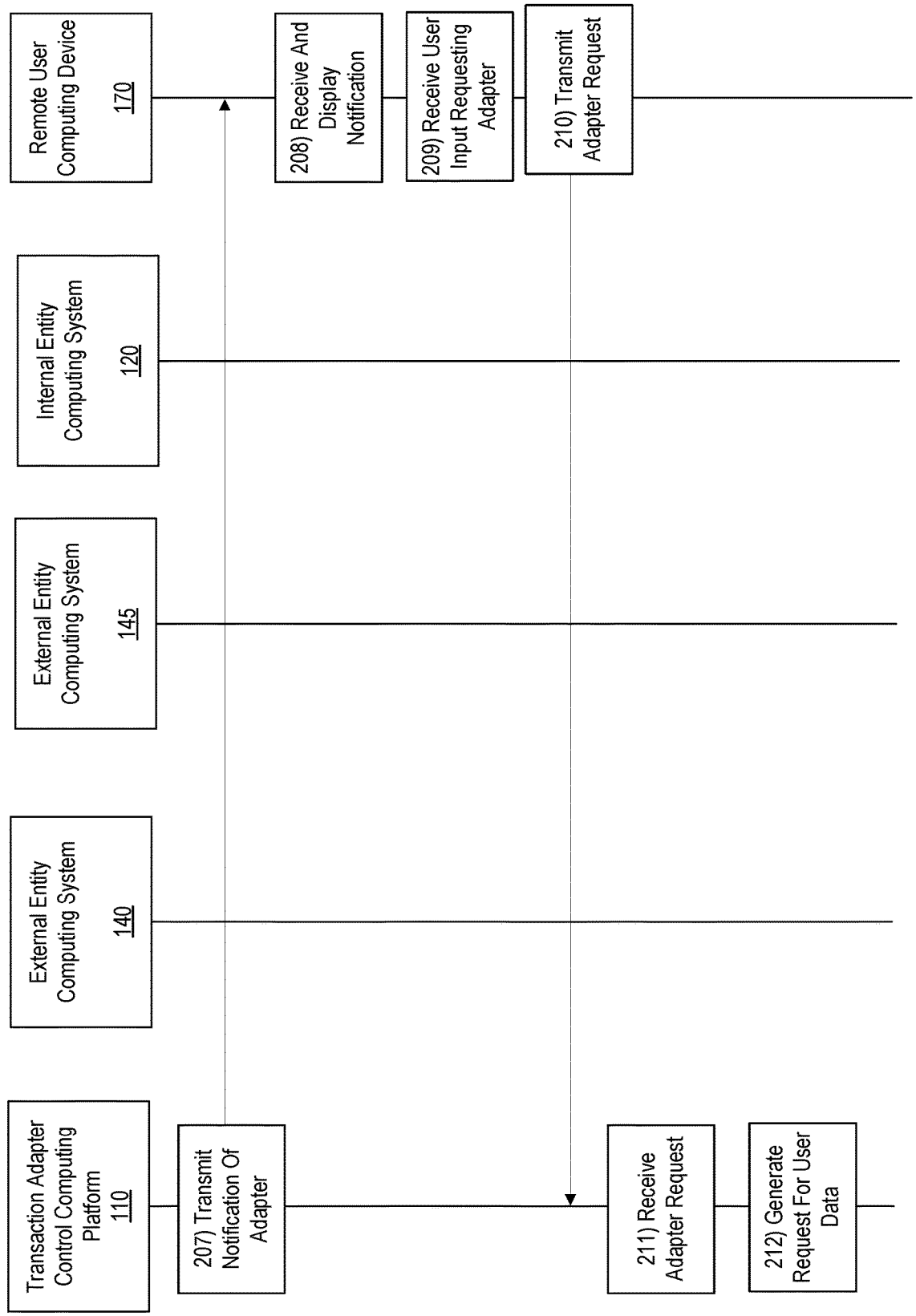

With reference to FIG. 2B, at step 207, the generated notification may be transmitted to the remote user computing device 170. For instance, the notification including the available options may be transmitted to the remote user computing device and displayed on the remote user computing device 170. In some examples, the notification may include a command or instruction causing the remote user computing device 170 to provide haptic feedback indicating that the notification has been received. In some examples, the notification may be transmitted via email, short message service (SMS), or the like.

At step 208, the notification may be received and displayed by a display of the remote user computing device 170. At step 209, user input including a request for a mobile transaction adapter may be received by the remote user computing device 170. For instance, the user may be displayed a plurality of adapters available for selection, as well as an option for system selected adapter. The user may provide input selecting an option and, at step 210, that input may be transmitted to the transaction adapter control computing platform 110. In some examples, transmitting the selection may include transmitting user identifying information, device identifying information, or the like.

At step 211, the received user input including selection of adapter or adapter request may be receive by the transaction adapter control computing platform 110.

If the user input received includes selection of a mobile transaction adapter from the available selections, the process may proceed from step 211 to step 232 in FIG. 2F.

If the user input received includes a request for system selection of a mobile transaction adapter, at step 212, in some examples, a request for user data may be generated. For instance, a request for user data associated with previous purchases or purchase history, payment or transaction processing, and the like may be generated.

Figure 2C:
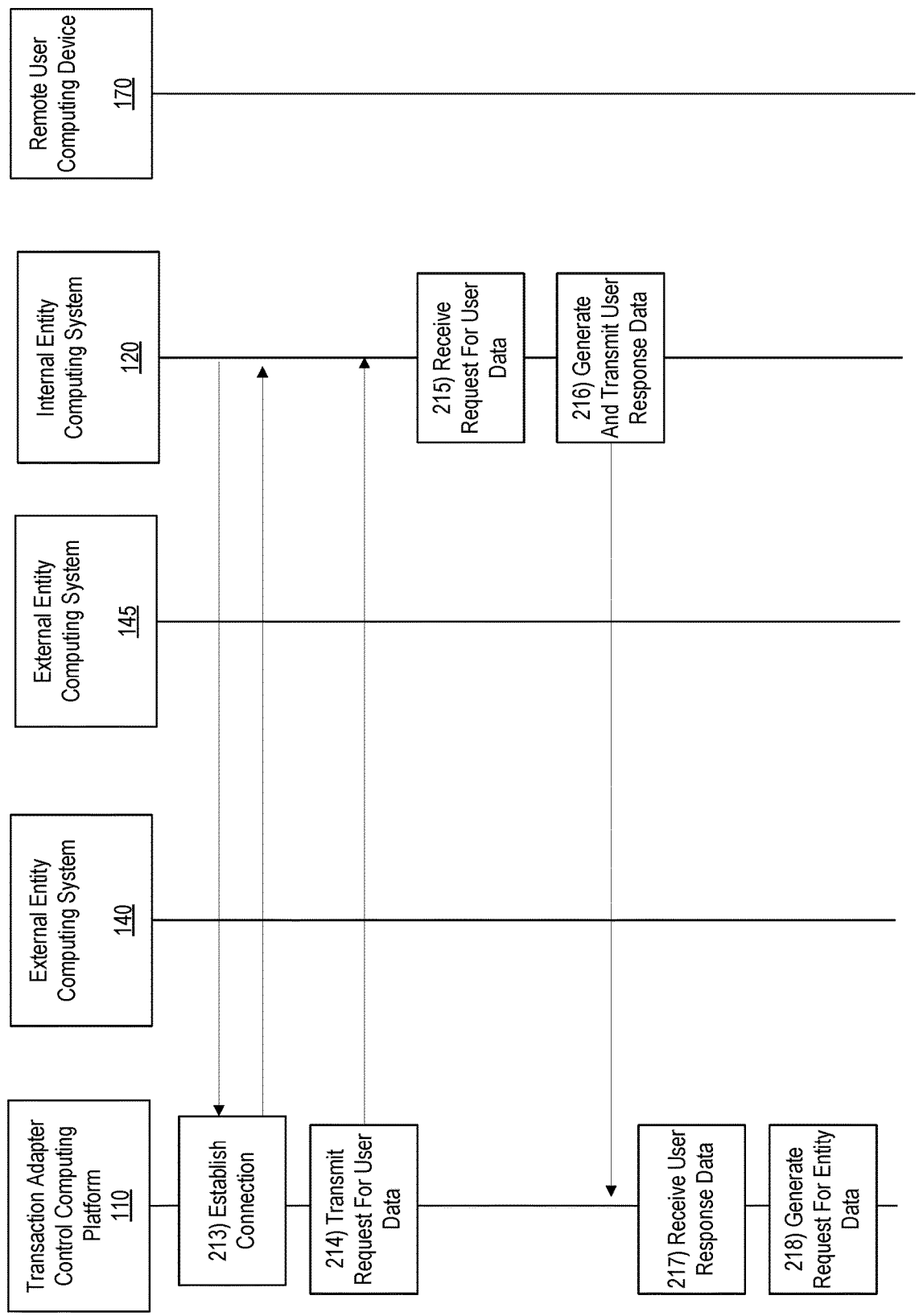

With reference to FIG. 2C, at step 213, a connection may be established between transaction adapter control computing platform 110 and internal entity computing system 120. For instance, a first wireless connection may be established between the transaction adapter control computing platform 110 and the internal entity computing system 120. Upon establishing the first wireless connection, a communication session may be initiated between transaction adapter control computing platform 110 and internal entity computing system 120.

At step 214, the request for user data may be transmitted to internal entity computing system 120. For instance, internal entity computing system 120 may store user data associated with one or more accounts, purchases, and the like. In some examples, the request for user data may be transmitted during the communication session initiated upon establishing the first wireless connection.

At step 215, the request for user data may be received and, at step 216, user response data may be generated and transmitted to the transaction adapter control computing platform 110.

At step 217, transaction adapter control computing platform 110 may receive the user response data. In some examples, user response data may further be used to reconcile one or more accounts of a user (e.g., after transaction processing).

At step 218, a request for external entity data may be generated. For instance, a request for data such as transaction processing fees, time for processing transactions, and the like may be generated. The request may include a request from one or more external entities, such as financial institutions, payment service providers, or the like.

Figure 2D:
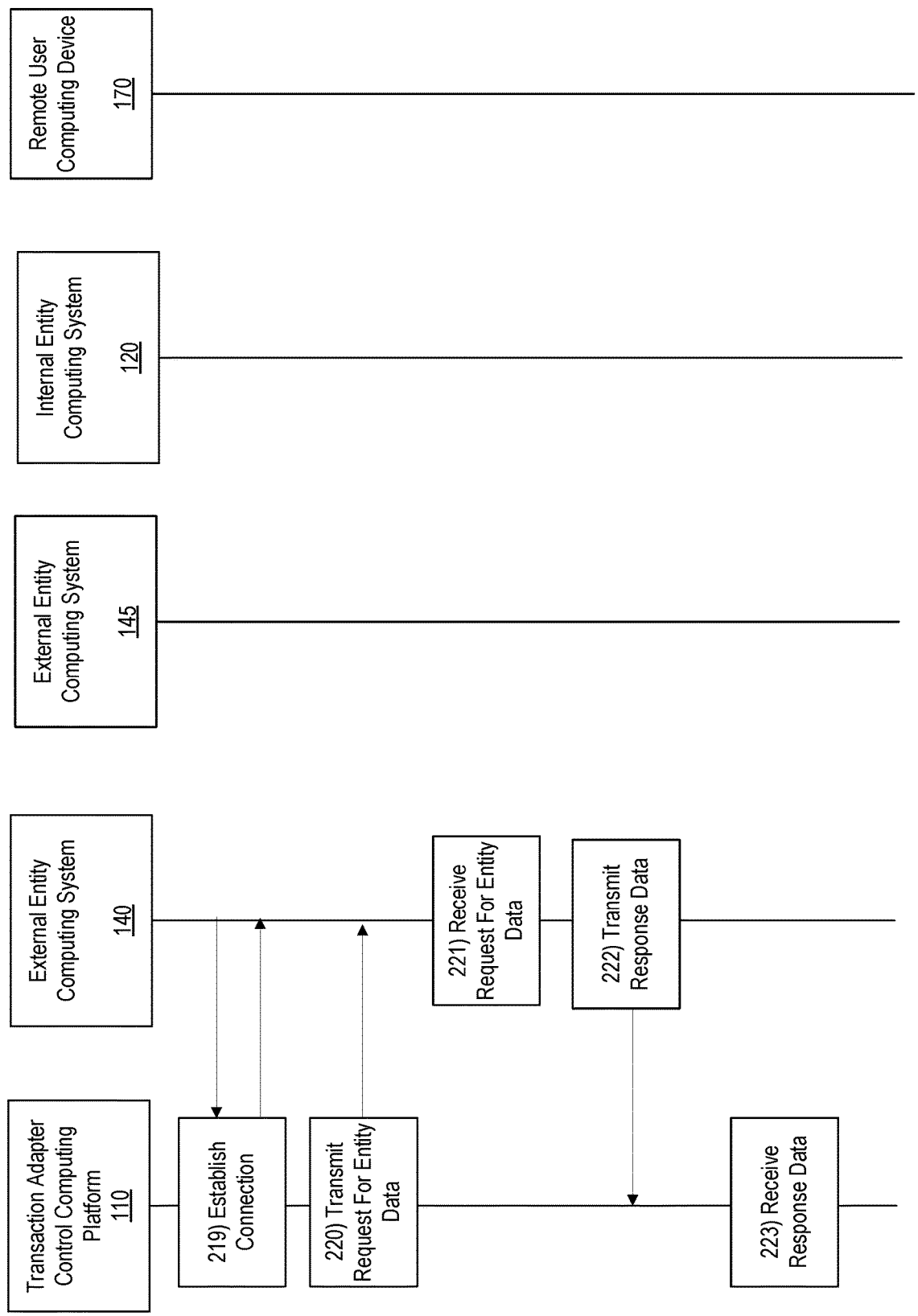

With reference to FIG. 2D, at step 219, a connection may be established between transaction adapter control computing platform 110 and the external entity computing system 140. For instance, a second wireless connection may be established between the transaction adapter control computing platform 110 and the external entity computing system 140. Upon establishing the second wireless connection, a communication session may be initiated between transaction adapter control computing platform 110 and external entity computing system 140.

At step 220, transaction adapter control computing platform 110 may transmit the request for external entity data to external entity computing system 140. For instance, the request for external entity data may be transmitted during the communication session initiated upon establishing the second wireless connection. At step 221, the external entity computing system 140 may receive the request for external data.

At step 222, external entity computing system 140 may generate first entity response data and may transmit the first entity response data to the transaction adapter control computing platform 110. For instance, the entity associated with external entity computing system 140 (e.g., a first external entity or service provider) may generate response data including the requested data related to fees, timing, and the like.

At step 223, the first entity response data may be received by the transaction adapter control computing platform 110.

Figure 2E:
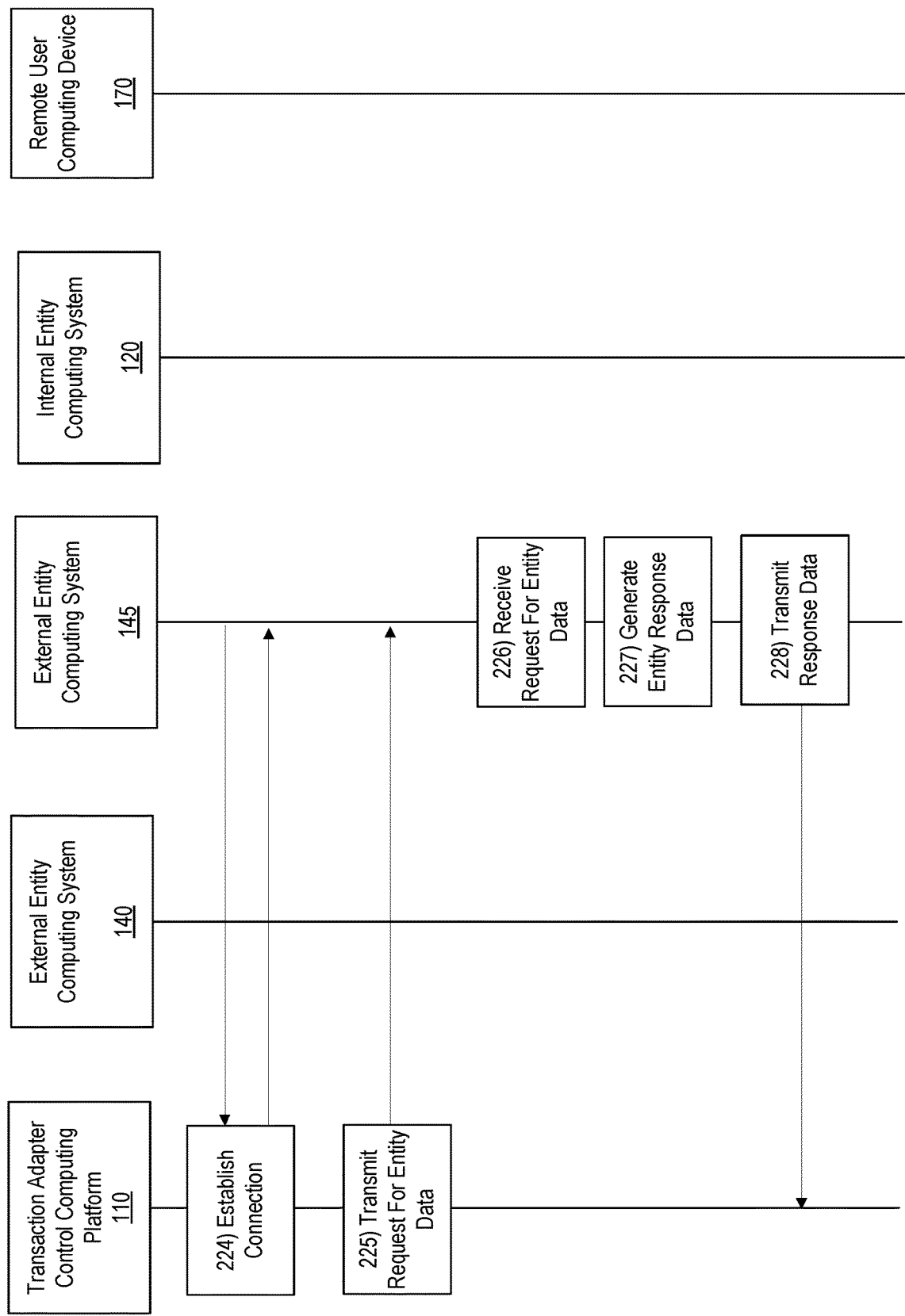

With reference to FIG. 2E, at step 224, a connection may be established between transaction adapter control computing platform 110 and the external entity computing system 145. For instance, a third wireless connection may be established between the transaction adapter control computing platform 110 and the external entity computing system 145. Upon establishing the third wireless connection, a communication session may be initiated between transaction adapter control computing platform 110 and external entity computing system 145.

At step 225, transaction adapter control computing platform 110 may transmit the request for external entity data to external entity computing system 145. For instance, the request for external entity data may be transmitted during the communication session initiated upon establishing the third wireless connection. At step 226, the external entity computing system 145 may receive the request for external entity data.

At step 227, external entity computing system 145 may generate second entity response data. For instance, the entity associated with external entity computing system 145 (e.g., a second external entity or service provider different from the first external entity or service provider) may generate entity response data including the requested data related to fees, timing, and the like.

At step 228, the generated second entity response data may be transmitted from the external entity computing system 145 to the transaction adapter control computing platform 110.

With reference to FIG. 2F, at step 229, the second entity response data may be received by the transaction adapter control computing platform 110.

Although two external entities are shown and described, transaction adapter control computing platform 110 may request and receive data from more than two service providers or entities without departing from the invention.

At step 230, the received first entity response data and second entity response data, as well as the received user data, may be analyzed to identify a preferred or optimal service provider or adapter. In some examples, a machine learning model may receive as inputs the first response data, second response data, and/or user data and may generate an output including a preferred or optimal service provider or adapter. In some examples, the machine learning model may identify patterns or sequences of data that may accurately and quickly analyze the input data to identify the output.

At step 231, based on the analysis performed at step 230, a service provider or adapter may be identified. In some examples, the service provider or adapter may be identified based on the output from the machine learning analysis. In some arrangements, more than one service provider or adapter may be identified.

At step 232, the identified transaction adapter (e.g., identified via machine learning analysis or identified based on machine learning analysis outputting an associated service provider) and/or a user selected transaction adapter may be transmitted by the transaction adapter control computing platform 110 to the remote user computing device 170. In some examples, more than one transaction adapter may be transmitted to remote user computing device 170. For instance, a user may select to receive more than one adapter to enable use of different adapters to perform different types of transactions (e.g., one adapter associated with a first service provider may be used to process payments or other transactions associated with a first account while a second, different adapter associated with a second, different service provider may be used to process balance inquiries or transfers associated with another account of the user).

At step 233, the transaction adapter may be received by the remote user computing device 170 and installed by the remote user computing device 170.

Figure 2G:
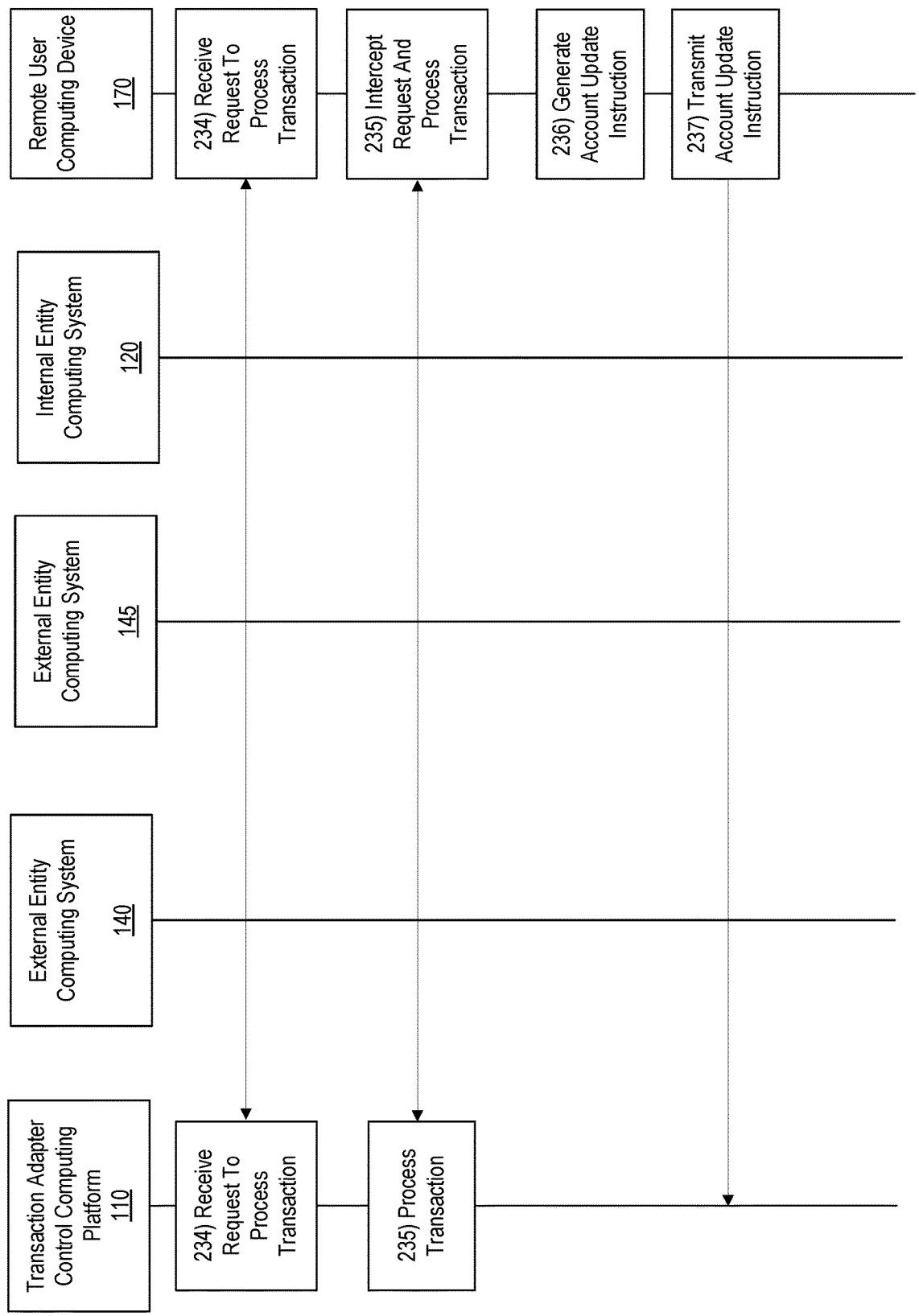

With reference to FIG. 2G, at step 234, a request to process a transaction may be received. The request to process a transaction may include transaction details, including type of transaction, amount of transaction, parties to transaction, and the like. In some examples, the request to process the transaction may be received after the transaction adapter has been installed on the remote user computing device 170. Additionally or alternatively, a request for transaction processing may cause the transaction adapter to be identified and/or installed on remote user computing device 170 (e.g., rather than detection of the new geographic location).

In some examples, the request to process the transaction may include a request to make a purchase using, for instance, a mobile payment application executing on the remote user computing device 170. The request for transaction may be received via the mobile payment application (e.g., for which the downloaded adapter is a plug-in). In some geographic locations, one or more mobile payment applications, such as applications used to process transactions or execute payments in the user's main or home geographic area, might not be configured to function or might not be enabled to function in the current geographic location of the user. Accordingly, the mobile transaction adapter may enable that functionality by re-routing the transaction through the transaction adapter.

In some arrangements, the request to process the transaction, as well as transaction details, may be transmitted to transaction adapter control computing platform 110. The data may be received and/or analyzed by the transaction adapter control computing platform 110. In some examples, user data, such as account data, may be retrieved by the transaction adapter control computing platform 110 to process a transaction.

Accordingly, at step 235, when the user requests transaction or payment processing via the mobile payment application, the identified and installed transaction adapter may be activated or enabled. In some examples, the transaction adapter may intercept the request to process the payment or transaction (or the request may be routed to the adapter) and may execute one or more functions in response to intercepting the request. For instance, the mobile transaction adapter may authorize and process the requested transaction. In some examples, processing the transaction may be performed in conjunction with the transaction adapter control computing platform 110. For instance, one or more aspects of transaction processing (e.g., account data retrieval, account reconciliation, or the like) may be performed by or via the transaction adapter control computing platform 110.

At step 236, an account update instruction may be generated. For instance, an update to an account or ledger based on the processing transaction may be generated. At step 237, the account update instruction may be transmitted to the transaction adapter control computing platform 110.

Figure 2H:
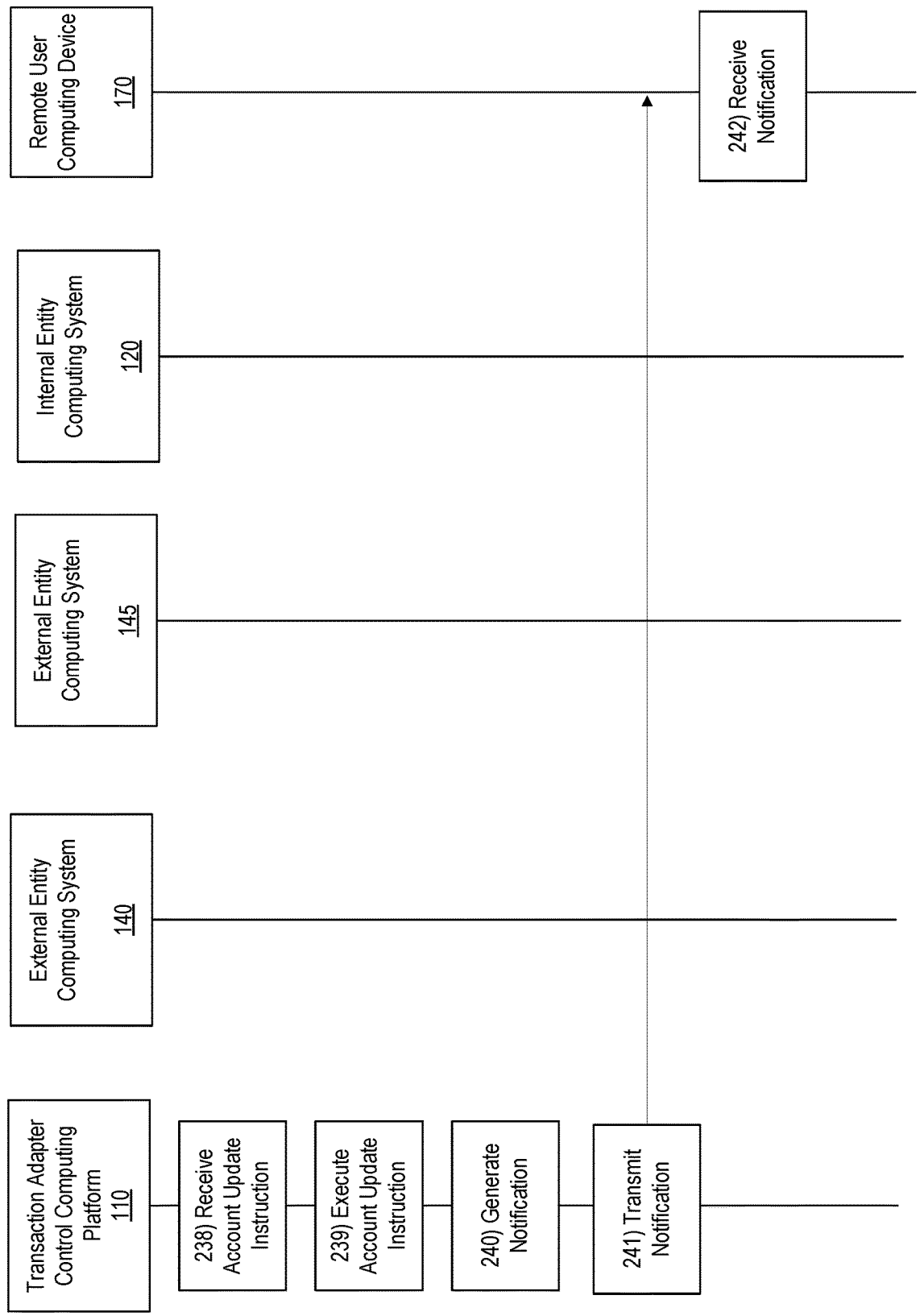

With reference to FIG. 2H, at step 238, the transaction adapter control computing platform 110 may receive the account update instruction and, at step 239, may execute the instruction. In some examples, executing the instruction may include updating an account or ledger based on the processed transaction.

At step 240, a notification may be generated. For instance, transaction adapter control computing platform 110 may generate a notification indicating that the requested transaction was processed and an account update has been executed. At step 241, the notification may be transmitted to the remote user computing device 170. At step 242, the notification may be received by remote user computing device 170 and displayed.

Figure 2I:
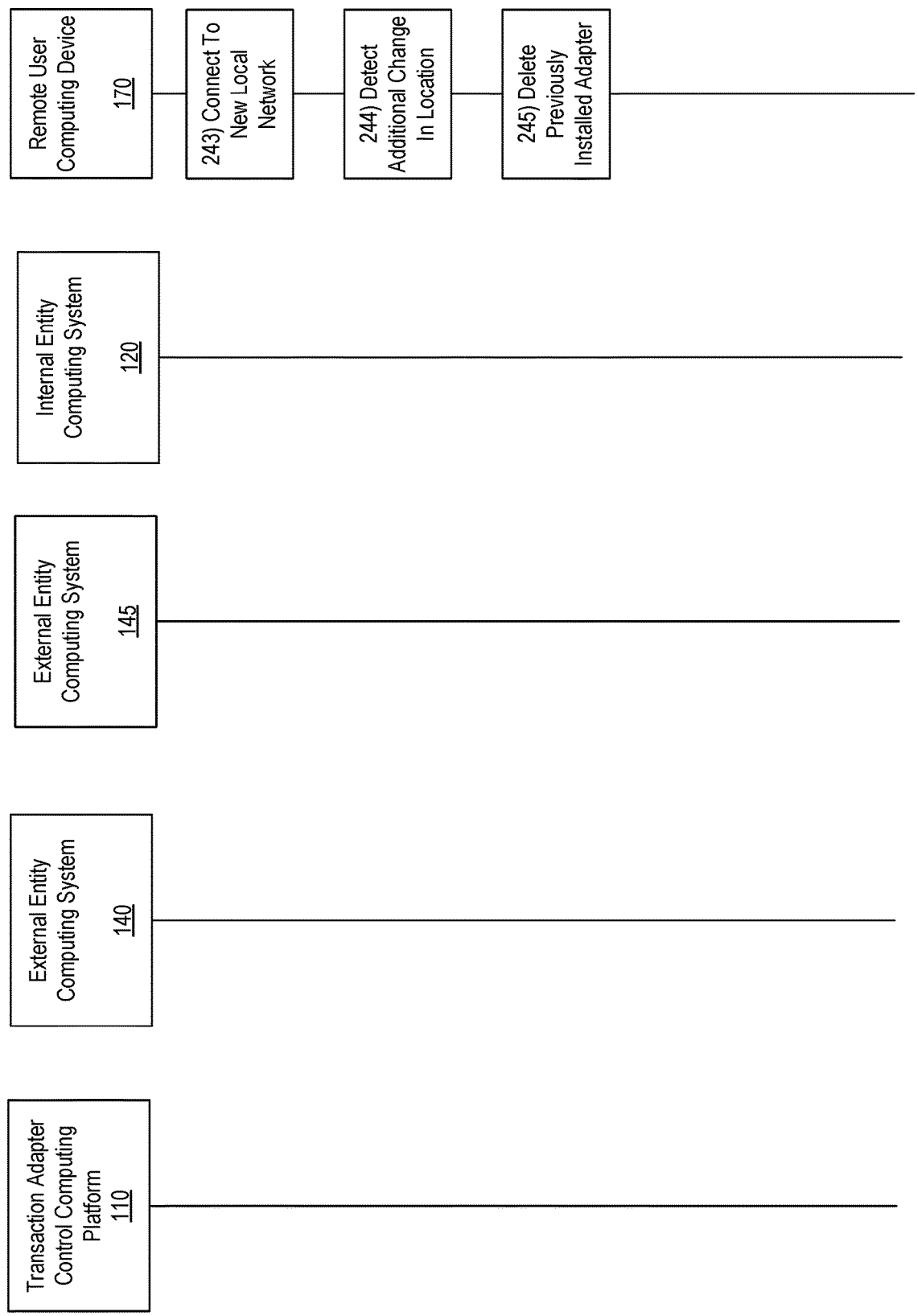

With reference to FIG. 2I, at step 243, the remote user computing device 170 may connect to a new or subsequent local network. For instance, a user may have changed locations and powered on or otherwise activated the remote user computing device 170 in the new location.

At step 244, the remote user computing device may detect an additional change in location. For instance, based on a local network connection, global positioning system data, or the like, remote user computing device 170 may detect a change in location.

Based on the detected change in location, at step 245, the mobile transaction adapter downloaded to the device 170 for the previous location may be uninstalled or deleted. In some examples, deleting or uninstalling the mobile transaction adapter may be performed automatically (e.g., without user input).

Figure 3:
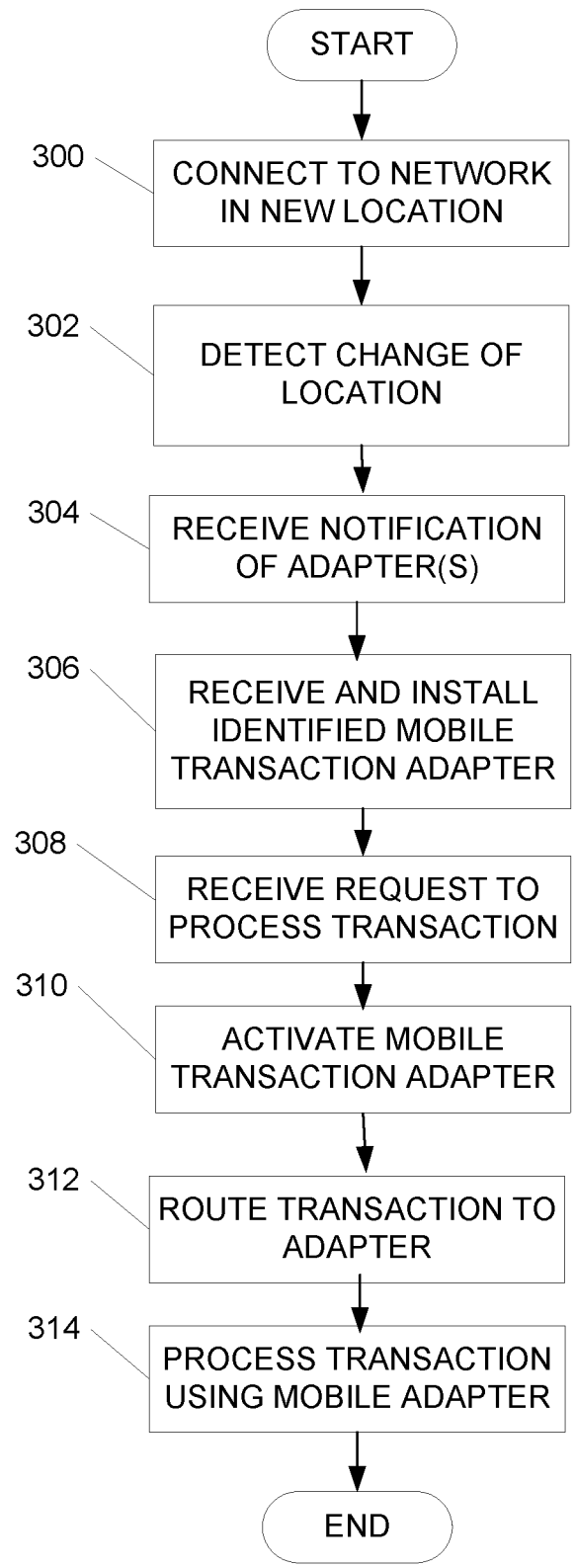
FIG. 3 illustrates one example method for implementing transaction adapter control functions in accordance with one or more aspects described herein.

FIG. 3 is a flow chart illustrating one example method of implementing transaction adapter control functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed in real-time or near real-time.

For instance, at step 300, a network connection may be established by the remote user computing device 170. For instance, the remote user computing device 170 may, automatically or upon request from the user, connect to a local network (e.g., cellular network, wi-fi network, or the like) at a new or current (e.g., different from a previously detected) geographic location. Establishing the connection may enable the remote user computing device 170 to communicate or interact with transaction adapter control computing platform 110.

At step 302, a change of location may be detected. For instance, geo-location data may be captured by, for instance, remote user computing device 170, and location data different from previous location data may be identified. In some examples, the new or current geographic location data may be detected upon, for instance, powering up or activating network connectivity of the remote user computing device 170 (e.g., upon arrival at a location, after disembarking an airplane, or the like). In some examples, current GPS or other location data may be compared to previous GPS or location data to identify or detect the change of location. In some examples, GPS or other location data may be captured and compared to previous data at periodic intervals. Additionally or alternatively, a user may activate location change detection, for instance, when planning a trip. In some examples, the change of location may be based on connection to a different network than a previous network.

In some examples, the detected change of location may be captured by the remote user computing device 170 and, upon establishing a network connection, the newly detected location may be transmitted to, for instance, transaction adapter control computing platform 110.

At step 304, a notification may be received indicating that one or more transaction adapters are available for selection or use. For instance, one or more mobile transaction adapters configured to enable functioning of a mobile payment or mobile banking application in the current geographic area may be identified and provided for selection. In some examples, the notification may include an option for system selection of an adapter.

At step 306, a transaction adapter for the new or current geographic location may be selected and downloaded by the remote user computing device 170. For instance, upon receiving the new or current geographic location data, transaction adapter control computing platform 110 may identify an appropriate transaction adapter for use in the new geographic location and may transmit the appropriate transaction adapter to the remote user computing device 170. In some examples, each geographic location may have a transaction adapter unique to that location that may facilitate payment, apply any applicable rules for payment processing, and the like. The remote user computing device 170 may then install the transaction adapter. In some examples, the remote user computing device 170 may also receive (e.g., from transaction adapter control computing platform 110) and display a notification indicating that a transaction adapter has been identified and installed/downloaded.

At step 308, a request for payment or transaction processing may be received. In some examples, the request for payment or transaction processing may be received via a mobile payment application executing on the remote user computing device 170. In some examples, the mobile payment application might not be configured to operate in the current geographic location of the user. Accordingly, the mobile transaction adapter may enable functionality.

At step 310, the transaction adapter may be activated and may intercept the request for payment. For instance, upon receiving a request for payment, the transaction adapter plug-in may identify the request and, at step 312, may route it from the payment application executing on the remote user computing device 170 to the transaction adapter or transaction adapter control computing platform 110 for processing.

At step 314, the requested payment or transaction may be processed. In some examples, the transaction adapter may process the payment at step 314. In some examples, processing the payment may include transferring funds from a financial institution local to the geographic location to the vendor or other party to the transaction. Accordingly, in some examples, downloading the transaction adapter may include establishing an account at the location institution. In some arrangements, this process may be performed by the transaction adapter control computing platform 110 such that it is seamless to the user (e.g., does not require user input or interaction).

Additionally or alternatively, processing the payment may include transferring funds from an account of a user that is local to the user's home location. Further, in some examples, processing of the payment may be performed by or in conjunction with the transaction adapter control computing platform 110. For instance, instructions to update an account or ledger may be transmitted to one or more financial institutions based on processing the payment or transaction.

In some examples, a notification of the processing may be transmitted to the remote user computing device 170.

Figure 4:
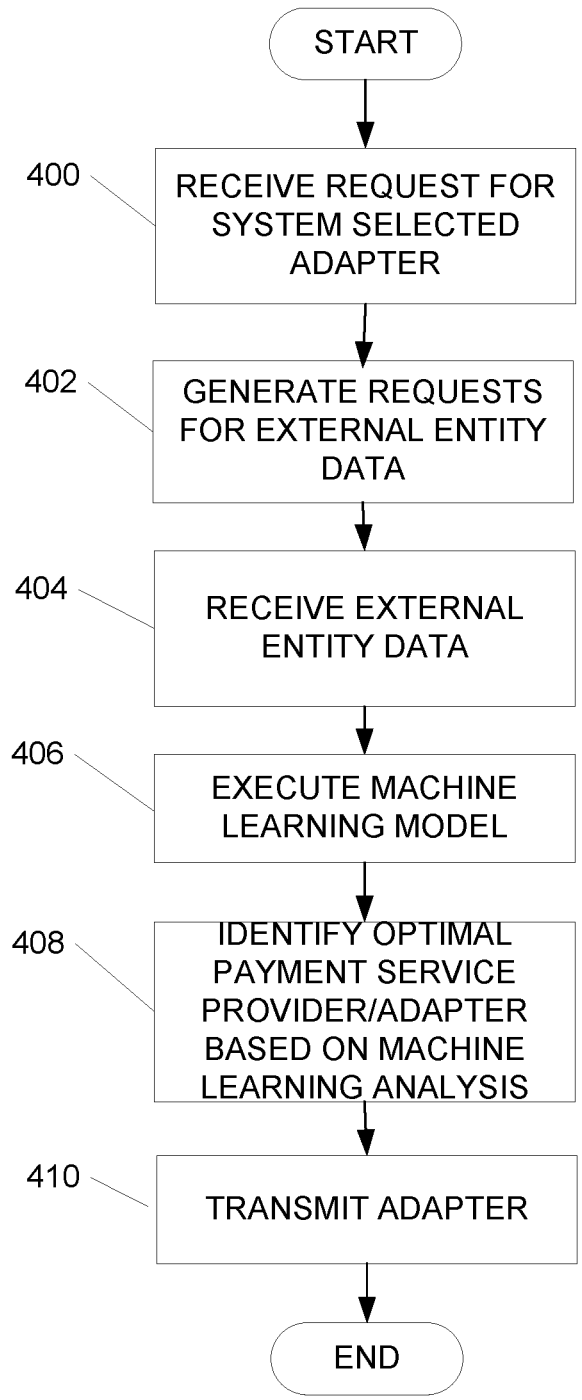
FIG. 4 illustrates another example method for implementing transaction adapter control functions according to one or more aspects described herein.

FIG. 4 is a flow chart illustrating one example method of implementing transaction adapter control functions to intelligently route request for payments or transactions according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed in real-time or near real-time.

At step 400, a request for a system selected mobile transaction adapter may be received. For instance, in response to display of one or more adapter options on a user device, a user may select an option for a system selected adapter and the request may be received by the transaction adapter computing platform 110.

At step 402, one or more requests for external entity data may be generated and transmitted to one or more external entity computing systems. For instance, requests for fee information, processing time information, and the like, may be generated and transmitted to one or more service providers operating in the geographic area. In some examples, generating requests for data may be performed in real-time such that the most recent data is available for use in identifying an appropriate transaction adapter.

At step 404, the external entity data may be received from the one or more external entity computing systems. The external entity data may be received from the one or more service providers operating in the geographic area.

At step 406, one or more machine learning models may be executed. The machine learning models may analyze the user data and external entity data and, at step 408, may identify one or more optimal or preferred service providers and/or mobile transaction adapters. In some examples, analyzing the data and identifying the one or more optimal or preferred service providers and/or associated mobile transaction adapters may be performed in real-time or near real-time.

At step 410, the identified adapter(s) may be transmitted or otherwise provided to the user computing device for installation and execution.

As discussed herein, the arrangements described enable simplified and efficient systems for processing payments or transactions in a variety of geographic locations. By downloading a transaction adapter unique to a geographic location and/or service provider, the adapter may include all rules, protocols and/or regulations associated with processing payments in the particular geographic location and may enable mobile transaction processing functionality via the mobile payment or banking application on the user's device. For instance, by providing an adapter as a plug-in or sub-application appended to a mobile banking or mobile payment application, the need for payment applications specific to each location is reduced or eliminated. This simplifies options for the user by automatically selecting and providing an adapter that will enable the user to process transactions seamlessly.

Further, in locations in which a local account is required to process payments, the system may establish an account for a user that may be linked to payment processing and the transaction adapter executing on the mobile device of the user. For instance, in some examples, a smart contract may be executed upon detection of certain criteria being met. For instance, if a user arrives in a country requiring a local account, the smart contract may execute to establish the account. In some examples, a user passport may be used to verify identity of the user in opening the account. The passport data may be captured and stored in the distributed ledger and may be used to establish identity. Upon detecting a subsequent change of location, the temporary account may be closed and the transaction adapter may be uninstalled from the user device.

As discussed herein, a smart contract may also be used to track user spending to capture local taxes paid that may be reimbursable to the user. For instance, as a user makes purchases, data associated with taxes paid may be captured in, for instance, a distributed ledger (e.g., blockchain, holochain, or the like). That data may then be used to determine an amount available for reimbursement to the user upon leaving the geographic area.

By using machine learning to evaluate different payment processing providers or services, the user may ensure that an optimal service is being used. In some examples, the different payment service providers may be evaluated each time a user requests payment (e.g., in real-time). Additionally or alternatively, an optimal provider may be identified and used for a predetermined time, predetermined number of payment processing requests, or the like, before data is received and analyzed to identify a subsequent optimal provider.

While aspects described herein are directed to determining an optimal or preferred service provider and/or transaction adapter, in some examples, a transaction type may be used to identify a best provider or adapter to use to process a transaction. For instance, one or more adapters may be downloaded to a user device. In some examples, upon receiving a request for a transaction, a transaction type may be determined and the requested transaction may be routed to the particular mobile transaction adapter associated with a service provider best suited to processing that type of transaction. In some examples, machine learning may be used to identify the best fit adapter or provider.

In some examples, a multiplexer/extension adapter may be used to provide adapter access to, for instance, an authorized user of a first user. In one example, if a user's child is traveling to another country, an extender may be provided to give the child access to process transactions via the adapter.

Figure 5:
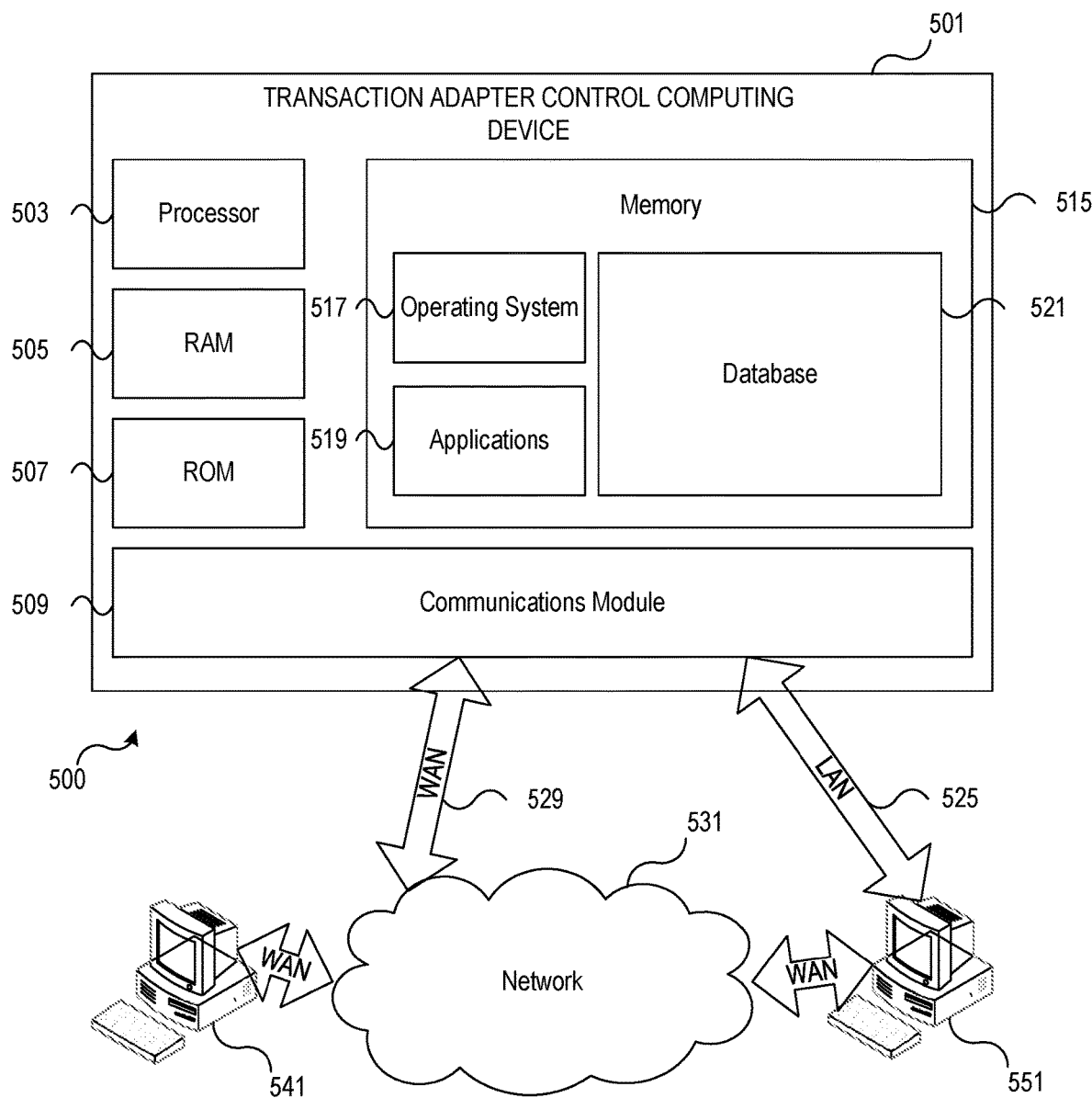
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include transaction adapter control computing device 501 having processor 503 for controlling overall operation of transaction adapter control computing device 501 and its associated components, including Random Access Memory (RAM) 505, Read-Only Memory (ROM) 507, communications module 509, and memory 515. Transaction adapter control computing device 501 may include a variety of computer readable media. Computer readable media may be any available media that may be accessed by transaction adapter control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by transaction adapter control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on transaction adapter control computing device 501. Such a processor may execute computer-executable instructions stored on a computer-readable medium.

Software may be stored within memory 515 and/or storage to provide instructions to processor 503 for enabling transaction adapter control computing device 501 to perform various functions as discussed herein. For example, memory 515 may store software used by transaction adapter control computing device 501, such as operating system 517, application programs 519, and associated database 521. Also, some or all of the computer executable instructions for transaction adapter control computing device 501 may be embodied in hardware or firmware. Although not shown, RAM 505 may include one or more applications representing the application data stored in RAM 505 while transaction adapter control computing device 501 is on and corresponding software applications (e.g., software tasks) are running on transaction adapter control computing device 501.

Communications module 509 may include a microphone, keypad, touch screen, and/or stylus through which a user of transaction adapter control computing device 501 may provide input, and may also include one or more of a speaker for providing audio output and a video display device for providing textual, audiovisual and/or graphical output. Computing system environment 500 may also include optical scanners (not shown).

Transaction adapter control computing device 501 may operate in a networked environment supporting connections to one or more remote computing devices, such as computing devices 541 and 551. Computing devices 541 and 551 may be personal computing devices or servers that include any or all of the elements described above relative to transaction adapter control computing device 501.

The network connections depicted in FIG. 5 may include Local Area Network (LAN) 525 and Wide Area Network (WAN) 529, as well as other networks. When used in a LAN networking environment, transaction adapter control computing device 501 may be connected to LAN 525 through a network interface or adapter in communications module 509. When used in a WAN networking environment, transaction adapter control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing device, comprising:
at least one processor;
a communication interface communicatively coupled to the at least one processor; and
a memory storing computer-readable instructions that, when executed by the at least one processor, cause the computing device to:
connect to a network in a current geographic location;
detect that the current geographic location indicates a change in geographic location of the computing device, the change in geographic location including detection of the current geographic location being different from a previous geographic location;
responsive to detecting that the current geographic location indicates a change in geographic location, receive, from a computing platform, a location-specific mobile transaction adapter associated with a provider in the current geographic location;
install the location-specific mobile transaction adapter to the computing device;
receive a request for transaction processing via a mobile payment application executing on the computing device;
responsive to receiving the request for transaction processing via the mobile payment application, activate the location-specific mobile transaction adapter;
route the request for transaction processing to the location-specific mobile transaction adapter; and
process the request for transaction processing via the location-specific mobile transaction adapter.

2. The computing device of claim 1, the instructions further including:
responsive to connecting to the network and detecting that the current geographic location indicates a change in geographic location of the computing device, receive a notification including location-specific mobile transaction adapter options available for selection.

3. The computing device of claim 2, wherein the notification includes haptic feedback.

4. The computing device of claim 2, wherein the notification includes options to select the location-specific mobile transaction adapter from a plurality of location-specific mobile transaction adapters and an option to automatically receive a system selected location-specific mobile transaction adapter.

5. The computing device of claim 1, wherein the location-specific mobile transaction adapter is a plug-in to the mobile payment application.

6. The computing device of claim 1, wherein connecting to the network in the current geographic location includes connecting to at least one of: a cellular network and a Wi-Fi network.

7. The computing device of claim 1, wherein the computing device is one of: a smartphone and a smart watch.

8. A method, comprising:
connecting a computing device, the computing device having at least one processor and memory, to a network in a current geographic location;
detecting, by the at least one processor, that the current geographic location indicates a change in geographic location of the computing device, the change in geographic location including detection of the current geographic location being different from a previous geographic location;
responsive to detecting that the current geographic location indicates a change in geographic location, receiving, by the at least one processor and from a computing platform, a location-specific mobile transaction adapter associated with a provider in the current geographic location;
installing, by the at least one processor, the location-specific mobile transaction adapter to the computing device;
receiving, by the at least one processor, a request for transaction processing via a mobile payment application executing on the computing device;
responsive to receiving the request for transaction processing via the mobile payment application, activating, by the at least one processor, the location-specific mobile transaction adapter;
routing, by the at least one processor, the request for transaction processing to the location-specific mobile transaction adapter; and
processing, by the at least one processor, the request for transaction processing via the location-specific mobile transaction adapter.

9. The method of claim 8, further including:
responsive to connecting to the network and detect that the current geographic location indicates a change in geographic location of the computing device, receiving, by the at least one processor, a notification including location-specific mobile transaction adapter options available for selection.

10. The method of claim 9, wherein the notification includes haptic feedback.

11. The method of claim 9, wherein the notification includes options to select the location-specific mobile transaction adapter from a plurality of location-specific mobile transaction adapters and an option to automatically receive a system selected location-specific mobile transaction adapter.

12. The method of claim 8, wherein the location-specific mobile transaction adapter is a plug-in to the mobile payment application.

13. The method of claim 8, wherein connecting to the network in the current geographic location includes connecting to at least one of: a cellular network and a Wi-Fi network.

14. The method of claim 8, wherein the computing device is one of: a smartphone and a smart watch.

15. One or more non-transitory computer-readable media storing instructions that, when executed by a computing device comprising at least one processor, memory, and a communication interface, cause the computing device to:
- connect to a network in a current geographic location;
- detect that the current geographic location indicates a change in geographic location of the computing device, the change in geographic location including detection of the current geographic location being different from a previous geographic location;
- responsive to detecting that the current geographic location indicates a change in geographic location, receive, from a computing platform, a location-specific mobile transaction adapter associated with a provider in the current geographic location;
- install the location-specific mobile transaction adapter to the computing device;
- receive a request for transaction processing via a mobile payment application executing on the computing device;
- responsive to receiving the request for transaction processing via the mobile payment application, activate the location-specific mobile transaction adapter;
- route the request for transaction processing to the location-specific mobile transaction adapter; and
- process the request for transaction processing via the location-specific mobile transaction adapter.

16. The one or more non-transitory computer-readable media of claim 15, the instructions further including: responsive to connecting to the network and detect that the current geographic location indicates a change in geographic location of the computing device, receive a notification including location-specific mobile transaction adapter options available for selection.

17. The one or more non-transitory computer-readable media of claim 16, wherein the notification includes haptic feedback.

18. The one or more non-transitory computer-readable media of claim 16, wherein the notification includes options to select the location-specific mobile transaction adapter from a plurality of location-specific mobile transaction adapters and an option to automatically receive a system selected location-specific mobile transaction adapter.

19. The one or more non-transitory computer-readable media of claim 15, wherein the location-specific mobile transaction adapter is a plug-in to the mobile payment application.

20. The one or more non-transitory computer-readable media of claim 15, wherein connecting to the network in the current geographic location includes connecting to at least one of: a cellular network and a Wi-Fi network.

21. The one or more non-transitory computer-readable media of claim 15, wherein the computing device is one of: a smartphone and a smart watch.

* * * * *